Nov. 18, 1952     G. A. MITCHELL     2,618,196
INTERMITTENT FILM MOVEMENT WITH FAST PULLDOWN
Filed Dec. 13, 1949     3 Sheets-Sheet 1

INVENTOR.
GEORGE A. MITCHELL,
BY
ATTORNEYS.

Nov. 18, 1952  G. A. MITCHELL  2,618,196
INTERMITTENT FILM MOVEMENT WITH FAST PULLDOWN
Filed Dec. 13, 1949  3 Sheets-Sheet 2

INVENTOR.
GEORGE A. MITCHELL,
BY
Bankelew & Scantlebury
ATTORNEYS.

INVENTOR.
GEORGE A. MITCHELL,
BY
ATTORNEYS.

Patented Nov. 18, 1952

2,618,196

UNITED STATES PATENT OFFICE 2,618,196

INTERMITTENT FILM MOVEMENT WITH FAST PULLDOWN

George A. Mitchell, Pasadena, Calif., assignor to Mitchell Camera Corporation, Glendale, Calif., a corporation of Delaware Application December 13, 1949, Serial No. 132,656

2 Claims. (Cl. 88—18.4)

This invention is concerned generally with intermittent film movements of the type in which the film advancing stroke of the film engaging member is driven by cam action. An important object of the invention is to provide a movement which has improved characteristics of velocity and acceleration along the movement path, particularly along that portion of the path that comprises the film advancing stroke.

In most movements of that type the film engaging member is a claw or claws, moved into and out of mesh with film perforations by a meshing stroke of the claw carrier. For purposes of simplicity and clarity the invention will be described typically as applied to illustrative forms of such a claw-type movement. But, as will be pointed out later, the invention is not limited to that type, but applies to any cam actuated type of movement regardless of how film engagement is effected.

When the film advancing stroke of the claw is very rapid, the accelerating force exerted by the claw teeth against the edges of the film perforations is correspondingly high, and may exceed what the film can safely withstand. The result is excessive wear at the perforation edges, and, under extreme conditions, a tendency to tear the film.

It has been proposed that such excessive film wear might be reduced for a given overall duration of the film advancing stroke, or that the duration of that stroke might be reduced without increasing the wear on the film, by suitably altering the time course of the stroke. For example, if the fraction of the stroke during which the claw is accelerated could be increased relative to the fraction during which deceleration takes place, the maximum rate of acceleration then could be reduced without lengthening the total stroke time. That reduction in acceleration would then reduce the maximum forward force exerted by the claw teeth upon the film. Such a proposal is described, for example, by Arthur Hayek in Journal of the Society of Motion Pictures Engineers, vol. 49, November 1947, page 405, but without suggestion of any specific structure either for increasing the accelerating fraction of the stroke or for decreasing the maximum acceleration.

Such an alteration in the time course of the film advancing stroke can of course be produced in principle by suitably modifying the shape of the cam that drives the claw. However, that method typically results in a cam having non-circular surfaces, increasing the cost of production and the technical difficulty of producing a smooth and long-lasting movement. That is particularly true of a cam mechanism of positive type, for example, a cam of constant diameter working between opposed parallel follower surfaces that are substantially rigid as to their mutual spacing and positively confine the cam. A cam of that type is preferably made with circular cam surfaces.

The present invention affords a very simple and convenient solution to the problem of modifying the time course of the film advancing stroke of such a positively confined cam mechanism in the manner indicated, without requiring the use of a cam with non-circular, or other specifically designed surfaces.

According to the invention, the opposed cam followers that positively confine the cam are provided with corresponding portions that are curved about a common center of curvature. That curvature is so chosen that the cam follower through which the driving cam applies an accelerating force to the claw during the accelerating phase of the film advancing stroke is convexly curved. As will be described, an effect of such a curved cam follower surface is relatively to slow down the accelerating phase of the film advancing stroke and then to speed up the decelerating phase of that stroke, the total stroke time typically remaining unchanged. A consequence of that change in the time course of the stroke is to reduce the value of the maximum rate of acceleration that occurs, and hence to reduce the maximum force exerted by the claw on the film. Another consequence of the invention is that the deceleration of the film takes place more rapidly than in a conventional movement. However, the decelerating force is exerted on the film largely as a uniform friction drag of the film in the film guide or ways. Hence, even with an increased rate of deceleration, the decelerating force that must be applied to the film via the claw is not excessive, and is not a practical disadvantage.

As will become apparent from the illustrative examples to be described, the invention may be embodied in substantially any known type of cam actuated film movement. The specific types of movements selected for illustration do not include all types to which the invention is applicable, but those selected for illustration or description are typical.

The invention is particularly, but not exclusively, useful in movements having a very short pull down time. Such movements include, for example, high speed intermittent movements that handle a relatively large number of frames per second; and quick action movements that handle a normal number of frames per second but perform the film moving operation in a relatively small fraction of the total movement cycle. Where the pull-down time is very short it is important to positively control the cam driven member (e. g. the claw arm) by cam confining ways engaging opposite sides of the constant width cam. In my invention these two opposed cam confining ways are thus curved parallel ways. And in operating between these two opposed parallel curved ways, the first half of the angular cam movement advances the film through less of its movement than does the last half of the cam movement. Or, expressed otherwise, it requires more than one half of the angular pull down movement of the cam to move the film advancing member through the first half of its stroke.

There are also other aspects of the invention which have to do with other and auxiliary means for further reducing the acceleration forces applied to the film perforations during the accelerating phase of the pull-down stroke. These auxiliary means in general may be described as means for reducing or removing the effective frictional drag on the film selectively during the accelerating phase. As described later, that may be done either by acutually releasing the frictional pressure on the film; or by applying to the film an accelerating force which partly or wholly balances the frictional drag so that in effect the drag is reduced or eliminated.

A full understanding of these and other objects, aspects and advantages of the invention will be had from the following description of certain illustrative embodiments, of which the accompanying drawings form a part. In the drawings.

Figure 4:
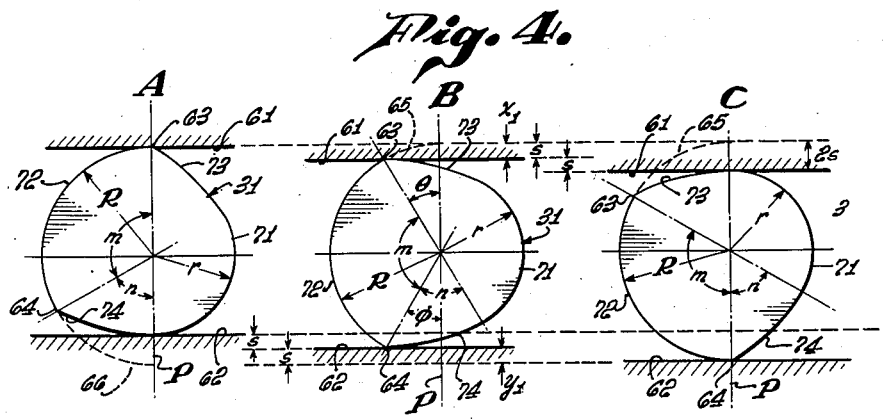
Figure 5:
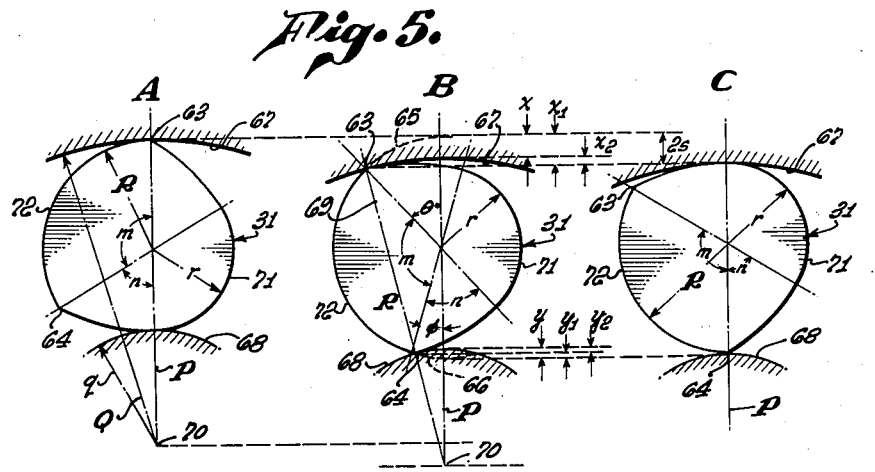
Figure 6:
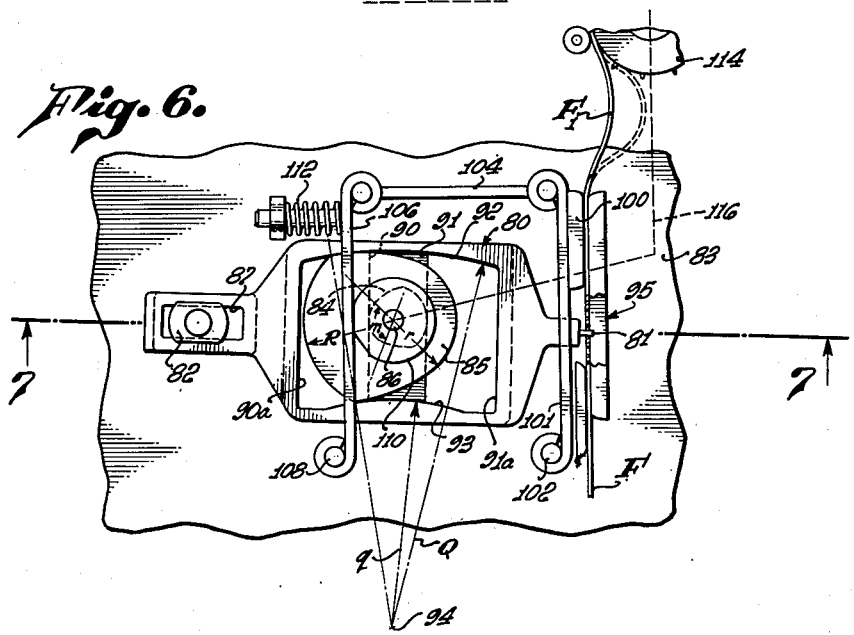
Figure 7:
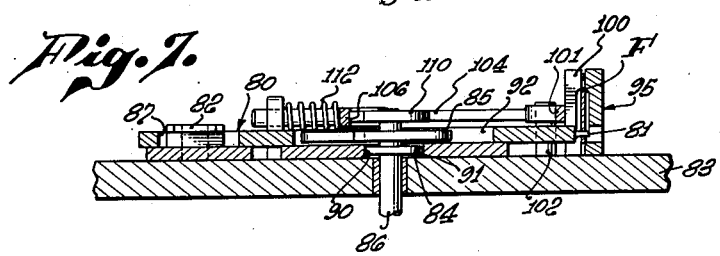
Figure 8:
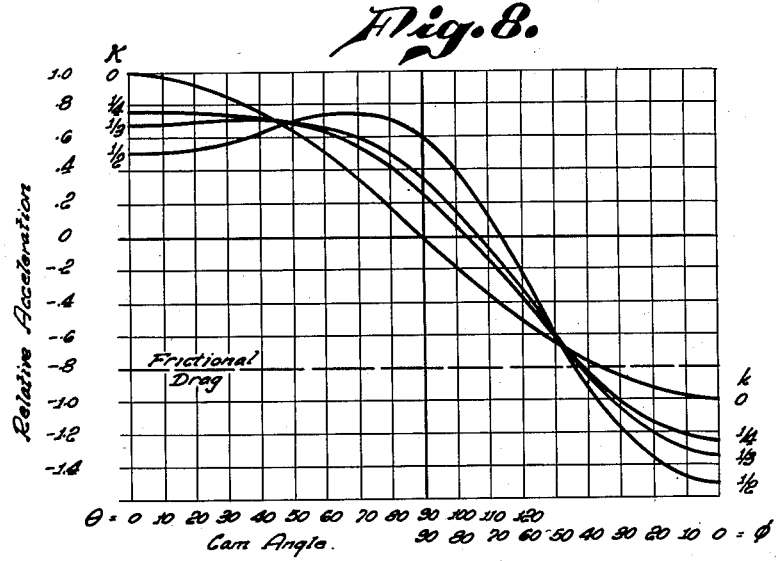
Figure 9:
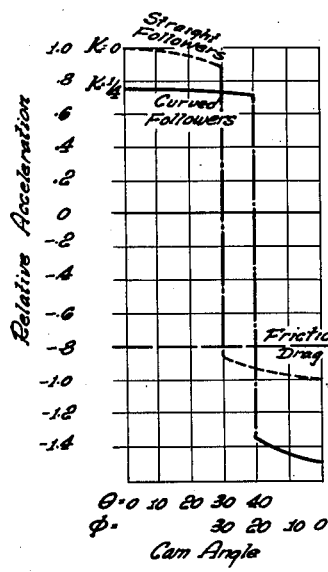
Figure 10:
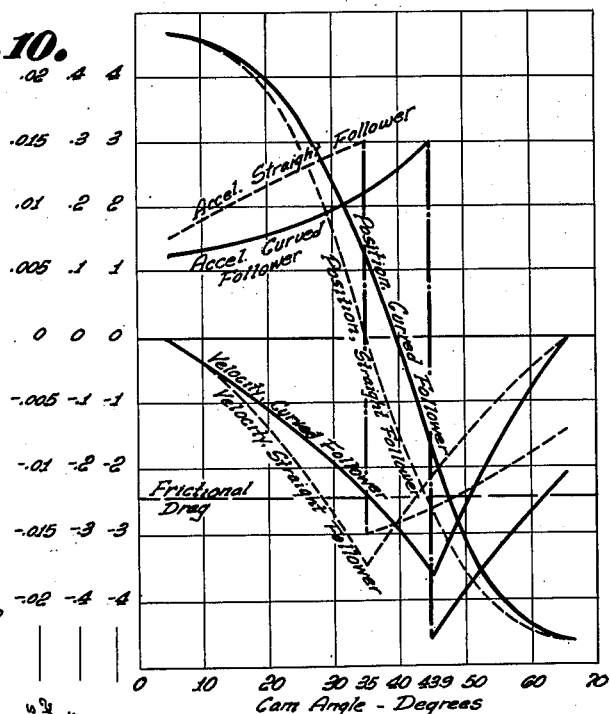

Figs. 4, A, B and C are diagrams illustrating the action of a constant width cam;

Figs. 5, A, B and C are diagrams illustrating the opertion of the invention;

Fig. 6 is an elevation of an illustrative claw movement of the swinging shuttle type embodying certain aspects of the invention; and Fig. 7 is a section on line 7—7 of Fig. 6;

Fig. 8 is a graph comparing the relative acceleration produced in accordance with the invention under various illustrative conditions;

Fig. 9 is a graph derived from Fig. 8 and representing typical specific conditions; and Fig. 10 is a graph comparing the performance of a pivoted-shuttle movement embodying the invention with that of a corresponding conventional movement.

Figure 1:
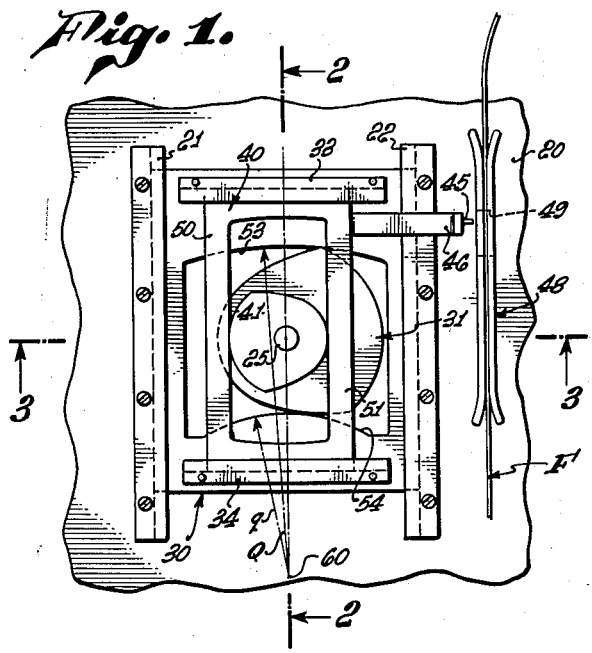
Fig. 1 is an elevation of an illustrative claw movement of the double slide type embodying certain aspects of the invention.
Figure 2:
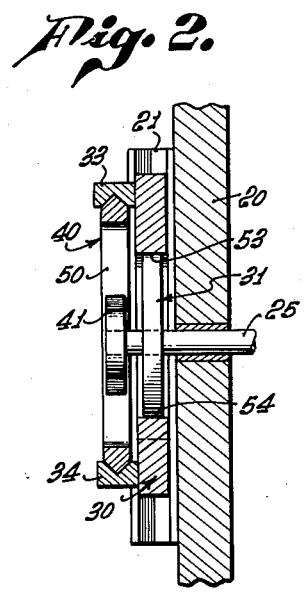
Fig. 2 is a vertical section on line 2—2 of Fig. 1.
Figure 3:
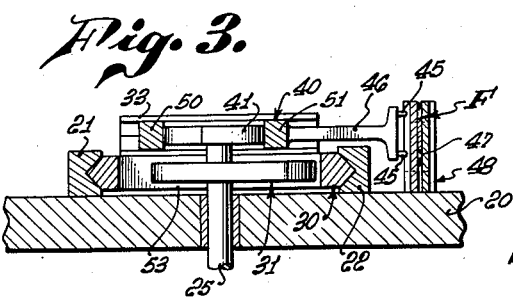
Fig. 3 is a horizontal section on line 3—3 of Fig. 1.

In illustration of application of the invention to the double slide type of movement, a specific form in which the main slide or carriage moves vertically and in which cams of different sizes and throws are used, is chosen as illustrative of the type. In Figs. 1-3 a supporting plate is shown at 20. A main carriage 30 slides in main ways 21, 22, its position being positively controlled by the cam 31. As illustrated, the reciprocatory motion of main carriage 30 is vertical.

A second carriage 40 slides in secondary horizontal ways 33, 34, which are rigidly mounted on main carriage 30. The motion of secondary carriage 40 in its ways, shown horizontal, is controlled by the cam 41. The two cams 31 and 41 are rigidly mounted on shaft 25, which may be driven by any suitable means, not shown. A set of film engaging claws 45 is mounted rigidly on secondary carriage 40, as by the arm 46, in position to intermittently engage perforations 47 of a film F in a suitable guideway. Such a guideway is indicated schematically at 48, mounted on supporting plate 20, and is provided with the usual slots 49 through which the claws reach the film F.

As illustrated, both of the cams 31 and 41 are of constant diameter type and work between two opposed and relatively fixed cam-confining cam followers. Meshing cam 41 engages the two parallel followers 50 and 51, mounted on secondary carriage 40, and thereby positively controls the horizontal position of that carriage in ways 33, 34. Cam rotation produces reciprocatory motion of the carriage, moving claws 45 intermittently into and out of film engagement. Pull down cam 31 engages followers 53 and 54, mounted on main carriage 30, and thereby positively controls the vertical position of that carriage 30 in ways 21, 22. Rotation of cam 31 produces vertical reciprocatory motion of main carriage 30 and hence also of secondary carriage 40 and claw 45. By suitable relative timing of the two cams, the reciprocatory stroke of the main carriage in one direction occurs while the claws are fully engaged, and therefore produces a film advancing stroke of the claws. The opposite movement of the main carriage is performed while the claws are fully disengaged.

Since meshing cam followers 50, 51 are straight and parallel to the length of the film in guideway 48, vertical motion of the main carriage 30, although moving secondary carriage 40 past its cam 41, does not alter the lateral position of claws 45 with respect to the film. Hence the meshing action of the claws is not affected by their vertical motion, either on the film advancing stroke or on the return stroke.

In accordance with the invention, the cam followers 53, 54 that engage pull down cam 31 are not straight, but are curved, and in the particular embodiment illustrated, are circularly curved about the common center of curvature indicated at 60. The radii of curvature Q and q of the followers 53 and 54 differ by the diameter of cam 31, so that the cam in all positions positively engages both followers, just as meshing cam 41 always positively engages the two straight followers 50, 51. The center of curvature 60 is preferably, although not necessarily, on a line through cam shaft 25 parallel to main ways 21, 22. One of the followers 53, 54 is thus convex and the other one concave.

To obtain the desired modification of the claw action, the convex follower should be the one which receives the thrust of the cam during the accelerating phase of the film advancing stroke of the claw. In the present illustrative movement, shaft 25 is normally rotated counter-clockwise, so that the film advancing stroke is downward, and the film accelerating thrust is taken by follower 54. Accordingly, lower follower 54 is shown convex, and 53 concave. If the mechanism were designed to move a film upward through film guide 48, as by clockwise rotation of shaft 25, the center of curvature 60 should be placed above the cam shaft, so that follower 53 would be convex and 54 concave.

The general manner in which the above described embodiment of the invention operates to modify the usual time course of the film advancing stroke can be understood from Figs. 4A–C and 5A–C. Figs. 4A–C illustrate diagrammatically a constant diameter cam similar to cam 31 of Figs. 1–3 (and designated for clarity by that numeral) working between straight parallel followers 61 and 62, which are considered to be mounted on a vertically movable carriage. As the cam rotates counter-clockwise through its throw angle $n$ from position A to position C, the cam followers are displaced vertically downward a distance equal to the throw of the cam, indicated in the figures as $2s$. Fig. 4B shows the cam half way between positions A and C, at which point the follower displacement is just half completed.

The term "constant diameter" cam refers to the property (more precisely defined, perhaps, as "constant width") that the distance between parallel tangents drawn to opposite cam faces does not depend upon their position of tangency. Perhaps the simplest form of constant diameter cam is the circular eccentric cam, which is used in many older movements, and which may be employed in carrying out the present invention. However, an eccentric has the disadvantage of providing no period of dwell.

A more suitable type of constant diameter cam is that which is sometimes referred to as a Lumiere cam, triangle cam, or heart cam. In its most common form, that cam is constructed on an equilateral triangle, one corner of which lies on the axis of cam rotation. Such a cam provides in one revolution two 120° throw periods each followed by a 60° dwell. The cam type shown illustratively in the present specification is a simple generalization of the Lumiere cam derived by varying the central angle $m$ of the triangle on which the cam is constructed. In the present drawings the dwell angle $m$ is shown typically as 120°, giving a cam action having dwell periods of 120° and throw periods of 60°. The cam surfaces comprise two concentric dwell surfaces 71 and 72, of smaller and larger radii, $r$ and $R$, respectively (Fig. 4A). The difference of those radii is equal to the cam throw, denoted by $2s$. The dwell surfaces are connected by throw surfaces 73 and 74, which are tangent to dwell surface 71 (of smaller radius $r$), but which meet dwell surface 72 (of larger radius $R$) at respective cam points 63 and 64. Each throw surface is a circular arc of radius $r+R$, described about the opposite cam point as center. As is well known, a cam of this general type can be constructed without any points or angles between its cam surfaces by adding a rim of constant width all the way around. Suitable modification of the following analysis, to accommodate that situation, as well as to include such other cam forms as the circular eccentric, will be obvious.

For convenience and clarity of description, such terms as upper, lower, right and left are used with reference to the present figures without implying any limitation of orientation or operation of the mechanism represented.

It may be observed in Fig. 4B that the upper point 63 of the cam, and follower 61 which it engages, have moved downward from their highest position (Fig. 4A) a distance $s$; and that the lower cam point 64 and follower 62 are a distance $s$ above their lowest position (Fig. 4C). In position A, upper follower 61 is tangent to dwell surface 72 at cam point 63; and in position B it is tangent to throw surface 73, again at cam point 63. Corresponding relations apply for lower cam follower 62 in positions B and C. Only at position B are both followers tangent to throw surfaces of the cam. The time course of the follower movement between positions A and B (that is, during the first half of the stroke) may be visualized most readily as the vertical component of the movement of upper cam point 63 along the arc 65, in Fig. 4B. Thus, during the first half of the stroke, the downward displacement $x_1$ of the carriage from its highest position is given by $$x_1 = R(1-\cos\theta) \qquad (1)$$

where $R$ is the radial distance of point 63 from the cam axis of rotation, and $\theta$ is the angle through which the cam has turned from position A. Hence the time course of $x_1$ during the first half of the stroke may be represented as a portion of a cosine curve.

Beyond position B (in a counterclockwise direction) upper cam corner 63 no longer engages cam follower 61, so the formula (1) no longer applies. However, during the second half of the stroke lower cam corner 64 engages follower 62 and may be considered to control the carriage motion in accordance with its motion along arc 66 in Fig. 4B. Thus, during the second half of the stroke the upward displacement $y_1$ of the carriage from its lowest position is given by $$y_1 = R(1-\cos\phi) \qquad (2)$$

where $\phi$ ($=180°-m-\theta$) is the angular displacement of the cam clockwise from position C. A comparison of (1) and (2) makes it clear that the time course of the stroke is symmetrical about the mid-position of the cam, Fig. 4B.

Both (1) and (2) are of the general form that represents the displacement produced by an eccentric of eccentricity $R$. Whereas such an eccentric would have a total throw $2R$, the present cam has the considerably smaller throw $$2s = 2R\left(1-\cos\frac{n}{2}\right)$$

The cam stroke is made up of a first portion identical in time course with the first portion of a much larger eccentric stroke, and a second portion identical in time course with the last portion of that eccentric stroke. The intermediate portion of the eccentric stroke does not appear at all in the cam stroke, thereby producing a shorter throw. As the cam throw angle $n$ is increased toward 180°, the cam stroke goes over into the eccentric stroke with throw $2R$, emphasizing that the eccentric is actually a special case of the constant diameter cam.

Turning now to the embodiment of the invention represented in Figs. 5A–C, in which the curved followers 67 and 68 have the common center of curvature 70, two aspects of the result may be distinguished. In the first place, the tangent position of the cam, at which both follower surfaces are tangent to throw surfaces of the cam, is not at the midpoint of the cam stroke (as in Fig. 4B). Instead, it is the position, represented in Fig. 5B, at which the line 69 between cam points 63 and 64 coincides with a radius through follower center of curvature 70, and therefore intersects both follower surfaces normally.

In the arrangement illustrated, the tangent position is later in the stroke than the midpoint.

That may be seen, for example in Fig. 5B from the fact that angle $\theta$ is larger than angle $\phi$. However, it is still convenient to divide the stroke into two portions, in the first of which (from the start of the stroke at $\theta=0$ to the tangent position of Fig. 5B) the carriage motion can be considered to be controlled by engagement of upper cam point 63 with upper follower 67; and in the second of which (from the tangent position to the end of the stroke at $\phi=0$) lower cam point 64 engages lower follower 68 and may be considered to control the carriage position.

In the second place, during either of those stroke portions, the carriage position does not correspond directly to the motion of the cam points along their respective arcs 65 and 66; it is necessary also to take account of the vertical component of the motion of the cam points with respect to (curved) cam followers. It will be seen from Fig. 5B that the carriage displacement $x$ during the first portion of the stroke is $$x = x_1 - x_2 \qquad (3)$$

and that the corresponding displacement $y$ during the latter portion of the stroke is $$y = y_1 + y_2 \qquad (4)$$

the quantities $x_1$, $x_2$, $y_1$, $y_2$ being clearly defined in the figure. The quantities $x_1$ and $y_1$ in Equations 3 and 4 correspond to the same quantities in Equations 1 and 2, and may be determined by those equations.

It is clear from the minus sign in (3) and from the plus sign in (4) that the effect of the curved followers is to relatively decrease the carriage displacement in terms of cam rotation as the cam starts the stroke and to relatively increase the displacement in terms of cam rotation as the cam finishes the stroke. Expressed in another way, the rate of carriage acceleration is relatively reduced in the early portion of the stroke, but the velocity continues to increase past the midpoint of the stroke to the tangent position. The rate of carriage deceleration in the second portion of the stroke is higher than the corresponding acceleration in the first portion of the stroke. The stroke thus becomes unsymmetrical in the desired sense, leading to a lower maximum rate of acceleration.

The actual values of the acceleration and deceleration can be calculated in terms of the cam rotation and the structural constants of the mechanism. For a movement of the slide type, such, for example, as has been described, the carriage acceleration $W$ during the first portion of the stroke is $$W = R \cos \theta - RK(1-K^2 \sin^2 \theta)^{-1/2}$$
$$(1-2 \sin^2 \theta + K^2 \sin^4 \theta) \qquad (5)$$

During the second portion of the stroke, the rate of deceleration $-W$ can be computed from $$-W = R \cos \phi + Rk(1-k^2 \sin^2 \phi)^{-1/2}$$
$$(1-2 \sin^2 \phi + K^2 \sin^4 \phi) \qquad (6)$$

In Equations 5 and 6, $K=R/Q$ and $k=R/q$, where $Q$ and $q$ are the respective radii of curvature of the upper and lower follower surfaces, for example 67 and 68 represented in Fig. 5. If the total cam throw is $2s$, then $$Q - q = R + r = 2R - 2s$$

from which $$k = \frac{KR}{R - 2KR + 2sK} \qquad (7)$$

The tangent position of the cam (Fig. 5B) is that for which $$q \sin \theta = Q \sin \phi$$

For example, if $Q/q=2$ and the cam dwell angle $m=120°$, then the cam tangent position is that for which $\theta=40.9°$ and $\phi=19.1°$.

Fig. 8 is a graph of the relative acceleration produced by a cam operating between confining followers of various curvature, indicated by various values of $K=R/Q$ and $k=R/q$. The curves as drawn include a full 180° cam stroke, and therefore represent the action of an eccentric through its throw of 180°, as well as that of a heart cam through its limited throw angle. Acceleration curves for a heart cam of any specified throw angle are obtainable directly from Fig. 8 by taking appropriate portions of the curves. For example, Fig. 9 illustrates such acceleration curves for a heart cam having a throw angle $n$ of 60° and a dwell angle $m$ of 120°. The dotted curve represents the relative acceleration of such an actual heart cam with straight followers. The solid curve gives the corresponding acceleration of the same cam with curved upper and lower followers for which the radii of curvature are $4R$ and $2R$, respectively. Because of the difference in curvature of the two followers, the left hand portion of that curve is identical with the corresponding portion of the curve for $K=¼$ in Fig. 8, while its right hand portion is identical with the corresponding portion of the curve in Fig. 8 for which $k=½$. The discontinuity in the acceleration as the cam passes through its tangent position is characteristic of the action of a heart cam. Graphs similar to Fig. 9 can be constructed from Fig. 8 for a cam of any specified stroke angle and for any values of $K$ and $k$ that are given in Fig. 8. Curves for intermediate values of the latter constants may be interpolated.

It is clear from Fig. 8 that a constant width cam of 180° throw angle (such as an eccentric) working between curved followers produces a progressively lower initial acceleration as the follower curvature increases. Also the acceleration remains positive for a progressively greater portion of the stroke. For any given follower curvature, the acceleration remains, through the first 46° or so of the stroke, less than the corresponding value with straight followers.

When $K=¼$ (that is, when the larger follower radius of curvature $Q$ is four times the larger cam radius $R$) the maximum acceleration to which the film is subjected is about 25 percent less than with straight follower surfaces. The initial acceleration at the very start of the stroke is reduced, for any value of $K$, by the factor $(1-K)$. The percent reduction of the acceleration is greatest at the start of the stroke, decreasing as the stroke progresses and changing over to an increase of acceleration at a cam angle of about 46°. That does not, however, involve an absolute increase in the acceleration unless $K$ is greater than about ⅓. At $K=½$, for example, there is an appreciable increase in acceleration in the midportion of the stroke, reaching a maximum at about 70°. That maximum must be taken into consideration with regard to any cam having a relatively large throw angle. However, with a cam of relatively small throw angle the accelerating phase of the stroke is limited to portions of Fig. 8 to the left of the crossover at 46°. Under that condition the relatively high follower curvature represented by a value of $K$ of ½ or more may be highly effective.

At a value of $K$ in the neighborhood of ¼, the film is accelerated at a substantially uniform rate over a remarkably wide range of the cam rotation. When the cam throw angle is less than about 120° the nearly uniform rate of acceleration extends throughout the accelerating phase of the stroke. By producing such a uniform rate of acceleration, the curved followers permit the film to be advanced more quickly than with straight followers, without exceeding the permissible maximum acceleration rate. Or, alternatively, the maximum acceleration, and hence the film wear, can be reduced without consuming any more total time in advancing the film.

It will be seen that the cam contacts the cam followers during the stroke above described (which typically represents the film advancing stroke) only on the left hand portions of the follower surfaces, as seen in the drawings. More accurately, the cam contact is limited to the portions of the follower surfaces to the left of a plane P through the cam axis 75 and normal to the follower faces in Fig. 4, or drawn through the common center of curvature 70 of the followers in Fig. 5. It is therefore clear that the shape of the follower surfaces to the right of that plane P does not affect the time course of the pull down stroke. It will affect the time course of the return stroke, during which the claw teeth are disengaged from the film.

Ordinarily the form of the return stroke is not a critical matter, and the portions of the follower surfaces that control that stroke can therefore be shaped arbitrarily as may be most convenient (subject, of course, to elementary limitations to insure operability). In general, it is most convenient to give both right and left portions of each follower the same curvature, as in the drawings, but that is not necessary for carrying out the invention. If the right hand portions of the followers are curved in the sense indicated in Fig. 5, the time course of the return stroke will be the opposite of that of the pulldown stroke, starting with a relatively high initial acceleration which changes to a relatively low rate of deceleration less than half way through the stroke. That time course can be visualized for various values of follower curvature by inverting the curves in Fig. 8.

The type of time course just described can be obtained also on the pulldown stroke by reversing the direction of curvature of those portions of the followers that control that stroke. For example, by locating the center of curvature 70 above instead of below the cam, the resulting pulldown acceleration is that represented by Fig. 8 when inverted.

Returning to consideration of the return stroke, if the right hand halves of the followers in Fig. 5 are straight and horizontal, the time course of the return stroke will be normal. If they are curved in the opposite direction to that shown, the return stroke may be made to have the same time course as the pulldown stroke, starting more gradually than normal, and stopping more abruptly.

Further, it is not necessary that the whole of the follower portions to the left of the defined plane should be curved. Under certain conditions a sufficient unsymmetry in the claw motion may be obtained by curvature of only a small portion of each follower. And the portions that are curved need not be circularly curved, although that usually facilitates manufacture.

By referring to the two followers as "parallel," it is not implied that they are straight, but only that a straight line intersecting both surfaces and normal to one is normal to the other, and that the separation of the two surfaces, measured along such a line, is uniform. Points of the two surfaces joined by such a line are here called corresponding points. When such parallel surfaces are circularly curved, they have a common center of curvature. If they are curved non-circularly they may still be spoken of as having a common center of curvature, although a more full statement would be that all corresponding pairs of elements of the two curved surfaces have common centers of curvature. Followers that are parallel in the above sense, whether curved or not, will, if appropriately spaced, firmly embrace and positively confine a constant width cam as it rotates.

Figs. 6 and 7 represent, somewhat schematically, an illustrative example of a pivoted shuttle movement, embodying the invention in its aspects so far rescribed and also, or certain additional aspects to be described. The claw arm, or shuttle, 80, carrying the usual film engaging claws 81 at one end, is slidingly pivoted at 82 on a supporting member 83 for oscillatory and reciprocatory motion. As illustrated for example, each type of motion is controlled, substantially independently, by one of the two cams 84 and 85, both rigidly mounted on cam shaft 86, which is journaled in supporting member 83.

Meshing cam 84 is shown as a constant width cam working between straight parallel followers 90 and 91 which are transverse to the length of the claw arm. Pulldown cam 85 is also of constant width type, and, in accordance with the present invention, works between curved confining followers 92 and 93 which are parallel in the sense defined above. As shown, followers 92 and 93 are circularly curved with their common center of curvature, indicated at 94.

Meshing cam 84 moves the claw arm intermittently in a reciprocating motion which carries claws 81 alternately into and out of engagement with a film in film guide 95. Pulldown cam 85 produces swinging strokes of the claw arm about pivot 82. If the cam shaft is rotated counter-clockwise as seen in Fig. 6, which is the normal direction of operation for the movement shown, downward strokes of the claw are produced by pulldown cam 85 during those dwell periods of cam 84 which maintain claws 81 in film engagement. Such downward strokes are therefore the film advancing strokes. They are driven (at least in their film accelerating phase) by the thrust of cam 85 against lower follower 93, which is convex toward the cam. The movement is shown in Figs. 6 and 7 with the cam at the tangent position during such a film advancing stroke. As already explained, cam contact with followers 92 and 93 during such a pull-down stroke is limited to the portions of the followers to the left of a plane through the cam shaft 86 and point 94, and it is only those portions, or an appreciable part of them, that need to be curved to provide the desired type of claw action.

The broad principles of operation of the invention, where embodied in a pivoted-shuttle movement, are similar to those already described with special reference to a reciprocating-shuttle movement, although the detailed action is somewhat modified in accordance with the particular structure and parameters of the mechanism.

In the illustrated structure, the longitudinal meshing movement of the shuttle, controlled by meshing cam 84, shifts the position of engagement of pulldown cam 85 along its followers 92 and 93. The mechanism is shown in Figs. 6 and 7 in its film engaging position. The pulldown followers are preferably so arranged that their center of curvature 94 (fixed with respect to the shuttle) has the desired relation to cam shaft 86 (in the present instance, in a plane through the cam shaft normal to the longitudinal shuttle axis) when the shuttle is in its film engaging position. Longitudinal shuttle movement to withdraw the claws from the film necessarily shifts that relation between cam and followers, and thereby slightly modifies the time course of the return stroke of the shuttle. Unless the meshing cam has an unusually large throw, that modification is very small, and even then is of little practical importance. That modification of the return stroke, of course, disappears if the follower portions that control the return stroke are straight rather than curved.

Even when the return stroke portions of the followers are curved, the described modification of the return stroke can be completely avoided (at least for the direction of cam rotation illustrated) by suitably locating on the shuttle the center of curvature of the return stroke portions of the followers with respect to that of the pulldown stroke portions. If those two centers of curvature are spaced longitudinally of the claw arm by the distance of throw of the meshing cam, each may be brought by the meshing movement of the shuttle into the same relation to the cam shaft during its effective stroke period. Each follower then comprises two curved portions having spaced centers of curvature and joined by a straight portion of length equal to that spacing. During the actual meshing movement of the shuttle, that straight portion of each follower slides over a dwell surface of the cam. Provision of such a straight section thus preserves the usual straight line motion of the claw on the meshing strokes. That is not necessary, however, and may not be desirable, since the arrangement shown in Fig. 6, for example, provides a slight lifting action of the claw as it is withdrawn from the film perforation, and a corresponding lowering action as it is inserted. Both of those motions may be advantageous in reducing any tendency of the claws to saw the perforation edges. Such lifting action can be increased, or can be counteracted if desired, by appropriate curvature or inclination of pivot slide 87 (Figs. 6 and 7), which slides with respect to pivot 82 at the same time that cam followers 92 and 93 move longitudinally past cam 85.

The above remarks may apply also to a sliding shuttle movement. For example, if the movement of Figs. 1-3 were modified by mounting meshing ways 33, 34, directly on the frame and mounting vertical ways 21, 22 on carriage 40, the meshing movement would be transmitted to both carriages and would produce sliding action of pulldown followers 53, 54 along cam 31. Also, pivoted shuttle movements may avoid any such action. For example, the claw may be slidable longitudinally of the shuttle, that sliding motion being controlled by a meshing cam. The shuttle proper may then be pivoted on the frame without any sliding freedom. The above remarks would not apply to such a movement.

Two features of the modification of Figs. 5 and 6 are more directly characteristic of pivoted shuttle movements. The swinging motion of the shuttle varies the angles of the follower surfaces with respect to their cams, thus modifying the timing of the pull down and return strokes of the shuttle. Also, the periodic shift of the point of contact of the pull down cam with its followers (caused by the cam shape) changes the mechanical advantage of the movement. Thus a given increment of vertical cam throw produces a varying increment of shuttle swing and hence of claw motion, depending upon the momentary position of cam engagement. Both of those effects tend relatively to accelerate the pull down stroke and slow down the return stroke in the particular described arrangement of Figs. 6 and 7. Both of those considerations are well understood in connection with a conventional pivoted-shuttle movement with straight pull down cam followers.

The modification produced in the claw pattern of a pivoted-shuttle movement by curvature of the pull-down cam followers is generally similar to that already discussed for a sliding shuttle movement, but is different in detail, primarily because of the two considerations just mentioned.

Fig. 10 is a graph showing in dotted lines the displacement, velocity and acceleration for the pull-down stroke of a particular illustrative pivoted-shuttle movement similar to that of Fig. 6 but with straight followers, plotted in terms of shuttle angle of swing from mid-position as functions of angle of cam rotation; and showing in solid lines the same variables for a movement which is otherwise identical, but has the pull-down cam followers typically curved in accordance with the invention. The dimensional constants of the particular movement selected for illustration in Fig. 10 are as follows, referring to Fig. 6:

Cam dwell angle $m$, 110° (not 120° as in the first discussed embodiment)
Larger cam radius R, 0.415"
Smaller cam radius $r$, 0.265"
Cam throw, $2s$, 0.150"
Distance M from pivot 82 to cam shaft 86, 0.925"
Upper follower radius Q, 1.66"
Lower follower radius q, 0.98"

Those dimensions are suitable for handling standard 16 mm. film if the claw is located at a distance of approximately 2M from pivot 82 during the film advancing stroke.

The effect of the curved followers is to reduce the initial acceleration at the start of the stroke by about 20 percent. In the central portion of the accelerating phase of the stroke the acceleration is nearly one third less than with straight followers. The rate of acceleration increases toward the end of the accelerating phase of the stroke (cam angle 43.9°), finally reaching approximately the same maximum value as with straight followers. However, the greater part of the film acceleration takes place far more gradually than with straight followers. With a cam having a smaller stroke angle, say 60° (as in Fig. 9), instead of 70°, that advantage would extend throughout the accelerating phase of the stroke.

Figs. 6 and 7 also show, schematically, structure which embodies certain other aspects of the invention referred to in the introductory part of this specification and now to be explained. The structure shown is merely typical, as will be understood from what follows.

As illustrated, the film F in the film guide 95 is pressed on by a pressure shoe 100 which is mounted so that it can be drawn back out of film contact to free the film. For simple illustration the shoe is shown as being mounted on an arm 101, pivoted at 102 at its lower end. The upper end of arm 101 is connected by link 104 with a cam follower 106 which is shown as pivoted at 108. Cam 110, on cam shaft 86 actuates the follower to move pressure shoe 100 away from film F against the pressure of spring 112 during certain phases of the operation. Except when moved away by the cam, shoe 100 is pressed against the film with a pressure which depends on the chosen pressure of spring 112. Sprocket 114 represents a constantly driven feed sprocket which feeds film constantly into film loop F1 above the film guide. A driving interconnection between the sprocket and the constantly rotating cam shaft 86 is indicated schematically by the heavy dash line 116. Film loop F1 may be a loop of ordinary formation, but, for the purposes of illustrating certain aspects of the invention, is here shown as a loop of such form that its stress tends to push the film down through the film guide. Such a loop builds up by film being fed into it by the feed sprocket during the dwell period, the loop straightening out and aiding film movement when the film is released for movement or is moved. It will be understood that the illustrative structure and arrangements just described may be applied to Fig. 1 or to any other type of film movement herein referred to. And the following observations of function have that universality of application in view.

First, we may consider a pressure shoe such as 100 being pressed at all times against film F; as shoe 100 would be if cam 110 and its function were omitted. Such a consideration is illustrative of the ordinary pressure shoe which puts a frictional drag on the film, as previously referred to. That a constant frictional drag is typically represented in Figs. 8, 9 and 10 by the line labelled "Frictional Drag," as a decelerating force. It is the existence of this force, in the deceleration phase of the previously described movements, that exerts most or all of the film decelerating force without depending upon perforation engagement for film deceleration. Consequently, the increased claw deceleration, which in my invention accompanies the decrease of acceleration, is of no import without that decelerating drag on the film, the claw deceleration of the film would necessarily increase with decrease in acceleration.

Referring to Figs. 6 and 7 again, the action of cam 110 will be considered. Note that cam 110 is so shaped and set with relation to cam 85 that it allows shoe 100 to re-engage film F substantially at the 43.9° position of Fig. 10, at which position the acceleration phase of the stroke is just ending and the deceleration phase just beginning. The film is past the middle of its pull-down movement. Cam 110 is so designed and set that it has engaged follower 106 approximately at or somewhat before the beginning of the pull-down stroke.

Now the effect of that cam action (still without considering the tension loop F1) is to remove the frictional drag on the film selectively for the duration of the accelerating phase of the pull-down stroke, and thus to further reduce the acceleration forces applied to the film perforations during the accelerating phase. In Figs. 9 and 10 that acceleration force is then represented by the areas between the zero acceleration axis and the curve representing acceleration for a curved follower. But the frictional drag will still be active during the deceleration phase to aid in stopping, or wholly to stop, the film, with little or no deceleration forces exerted on the film perforations.

Finally the cooperative action of the tensed film loop F1 may be considered. At the beginning of the pull down stroke, when pressure shoe 100 is just being relieved, the film loop and its stress are at a maximum (see dotted line shown in Fig. 6). If the action of cam 110 is to entirely remove all frictional drag on the film, as before described, then the loop stress adds its acceleration force to the film and the result is that the necessary perforation-applied forces are still further reduced. That is, the drag force is not only removed, but a positive acceleration is reached independently of perforation-applied forces. In that sort of action the frictional drag is used not only for its final decelerating action, but also as a lock on the film to hold it against movement by the loop stress before the pull-down movement starts. In its locking function the drag must of course be greater than the film moving force of the loop-stress.

However, the film loop stress may be utilized to reduce the necessary perforation-applied forces without concomitant relief, or without full relief, of the frictional drag. For purposes of considering that, we may again first think of shoe 100 as a constantly applied pressure shoe, exerting a frictional drag on the film just slightly greater than the maximum film moving force of the film loop. The stress of the loop is greatest when the loop is most bent, as it is at the beginning of the pull-down stroke. By the time the position of Fig. 6, or of Fig. 4B, is reached the loop stress is nearly spent. Thus, under those conditions of operation, at the beginning of the pull down stroke the frictional drag on the film is in effect largely removed by being opposed by a nearly equal accelerating force. But by the time the decelerating phase of the stroke is reached (Fig. 6) the frictional drag is but little opposed and at the end of the stroke is not opposed at all; so that it performs its film decelerating function substantially fully.

In the mode of operation considered in the immediately preceding paragraph the maximum film moving force of the film loop needs to be only slightly less than the decelerating force of the constantly applied drag; so that, at least during a part of the accelerating phase of the movement, the decelerating force of the drag is substantially completely overcome by the loop force. The constantly applied drag can, however, be completely overcome—completely effectively removed—during a large part or substantially the whole of the accelerating phase of the stroke by making the loop exerted force greater than the constant drag force. In that instance, some means additional to the constant drag should be used to hold or lock the film against movement by the loop force before the film advancing stroke begins. Such an arrangement may be visualized from Fig. 6 by supposing for instance that shoe 100 applies a constant drag less than the maximum film moving force of the loop, and that the film is locked by an ordinary pilot pin which is released at the start of the advancing stroke. Or, the constant drag may be applied by a pressure shoe other than shoe 100; for instance by any of the usual pressure shoe arrangements such as those that are ordinarily carried by a film gate. The cam actuated shoe of Fig. 6 can then be used to apply additional pressure for holding the film until the start of the advancing stroke.

Although the chosen illustrative movements each involve two cams—one for meshing movement and the other for pulldown—the invention is equally applicable to movements using but a single cam or cam member. In the chosen illustrative movements two cams—or cams of different sizes—are used for the primary practical purpose of making the meshing stroke relatively small. On the other hand, movements using only a single "boxed" cam are known; and the invention may be applied to that type simply by curving both the pulldown follower surfaces of the cam confining box. For instance such an application of the invention can be visualized from Fig. 6 by supposing that cam 84 and its followers 90 and 91 are omitted, and that the vertical parallel faces 90a and 91a engage a cam such as 85 which in that case rotates clockwise to move film down.

The present invention may be embodied in many types of film movement. For example, the mechanism for controlling the meshing action of the claw may be of any known type. That meshing may be positively controlled, as in the embodiments described above, or it may depend upon ratchet or similar action of pawl-like members which are mounted, for instance, on a vertically reciprocating carriage like that shown at 30 in Fig. 1, and require no positively actuated meshing stroke. Or the film engagement may be by gripping the film instead of meshing with perforations. Alternatively, the film may be directly driven by continuously engaged means such as a sprocket, the latter being driven intermittently by the back and forth movement of a cam-actuated member. The present invention is concerned with the production of the film moving stroke, regardless of how film engagement is effected.

In the case of a claw or other member intermittently engaging the film, it is immaterial whether that engagement occurs on every downward stroke, or only on alternate or occasional strokes. The engaging action may involve movements parallel to the axis of the pulldown cam. Movements of all of those types and many more are well known in the art. Suitable manners of embodying the present invention in each of them will be readily understood from the above description of two typical examples.

In the following claims the term "shuttle" is used in the sense of including any member whose cyclic movement includes a film advancing stroke. The terms "up" and "down" are entirely relative to the film, which is assumed, for purposes of description only, to be moved "down."

I claim:
1. In combination with a film guide, a film movement mechanism having a constant width pull down cam positively confined between opposed parallel pull down cam followers which are mounted for movement in a film moving direction, said followers having corresponding portions that are curved about substantially the same center of curvature, and the follower which moves away from the cam axis of rotation during the pull down stroke being convex, so that the film accelerating phase of the film pull down stroke is longer in terms of cam rotation than is the succeeding decelerating phase of the pull down stroke, means for exerting upon the film a frictional drag, and control mechanism for the drag means acting in timed relation to the cam to relieve said drag during the accelerating phase of the pull down stroke and to apply the drag during the decelerating phase of the pull down stroke of the cam.

2. In combination with a film guide, a film movement mechanism having a constant width pull down cam positively confined between opposed parallel pull down cam followers which are mounted for movement in a film moving direction, said followers having corresponding portions that are curved about substantially the same center of curvature, and the follower which moves away from the cam axis of rotation during the pull down stroke being convex, so that during the pull down stroke the maximum rate of film acceleration is appreciably less than the maximum rate of film deceleration, means for exerting on the film a frictional drag sufficient to decelerate the film at a rate at least equal to the difference between the said maximum rates of acceleration and deceleration, and means for relieving said drag during the accelerating phase of the pull down stroke and for applying the drag during the decelerating phase of the pull down stroke.

GEORGE A. MITCHELL.

REFERENCES CITED

The following references are of record in the file of this patent:

UNITED STATES PATENTS

| Number | Name | Date |
|---|---|---|
| 1,244,919 | Thomas | Oct. 30, 1917 |
| 1,571,206 | Lautenschlager | Feb. 2, 1926 |
| 2,051,602 | Holden | Aug. 18, 1936 |
| 2,457,409 | Shea | Dec. 28, 1948 |
| 2,481,115 | Heutier | Sept. 6, 1949 |